Nov. 15, 1949  H. B. PHILLIPS ET AL  2,488,140
LAWN MOWER
Filed Feb. 15, 1946  3 Sheets-Sheet 1

INVENTORS
Harold B. Phillips
Kenneth E. Kirkpatrick
BY
M. Y. Charles
ATTORNEY.

Nov. 15, 1949   H. B. PHILLIPS ET AL   2,488,140
LAWN MOWER
Filed Feb. 15, 1946   3 Sheets-Sheet 2
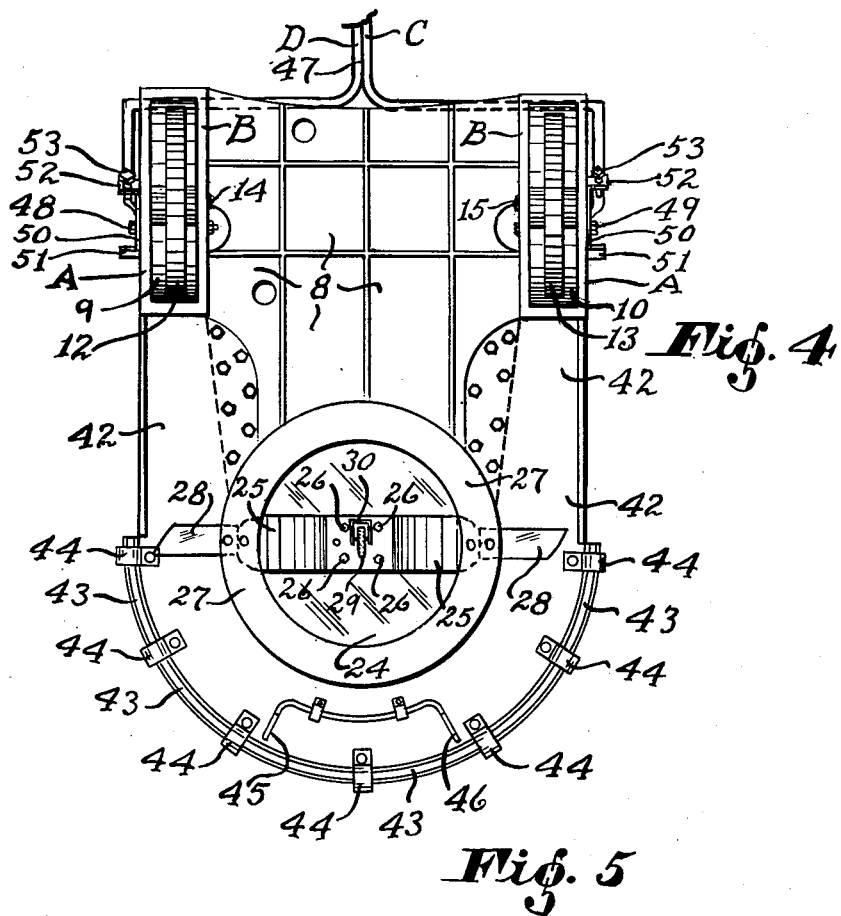
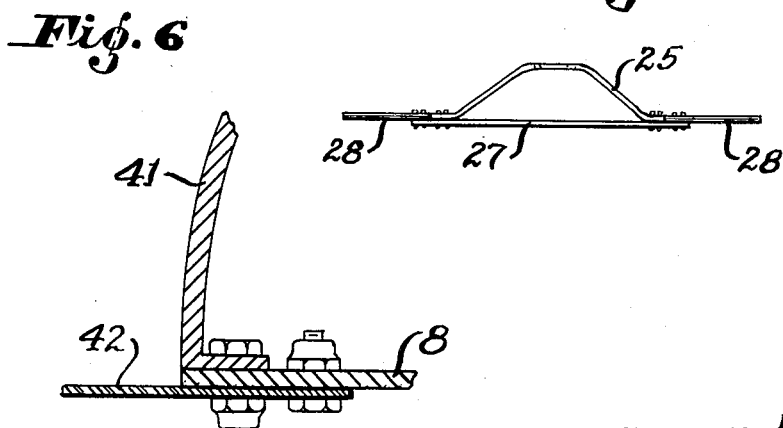
INVENTORS
Harold B. Phillips
Kenneth E. Kirkpatrick
BY
M. Y. Charles
ATTORNEY.

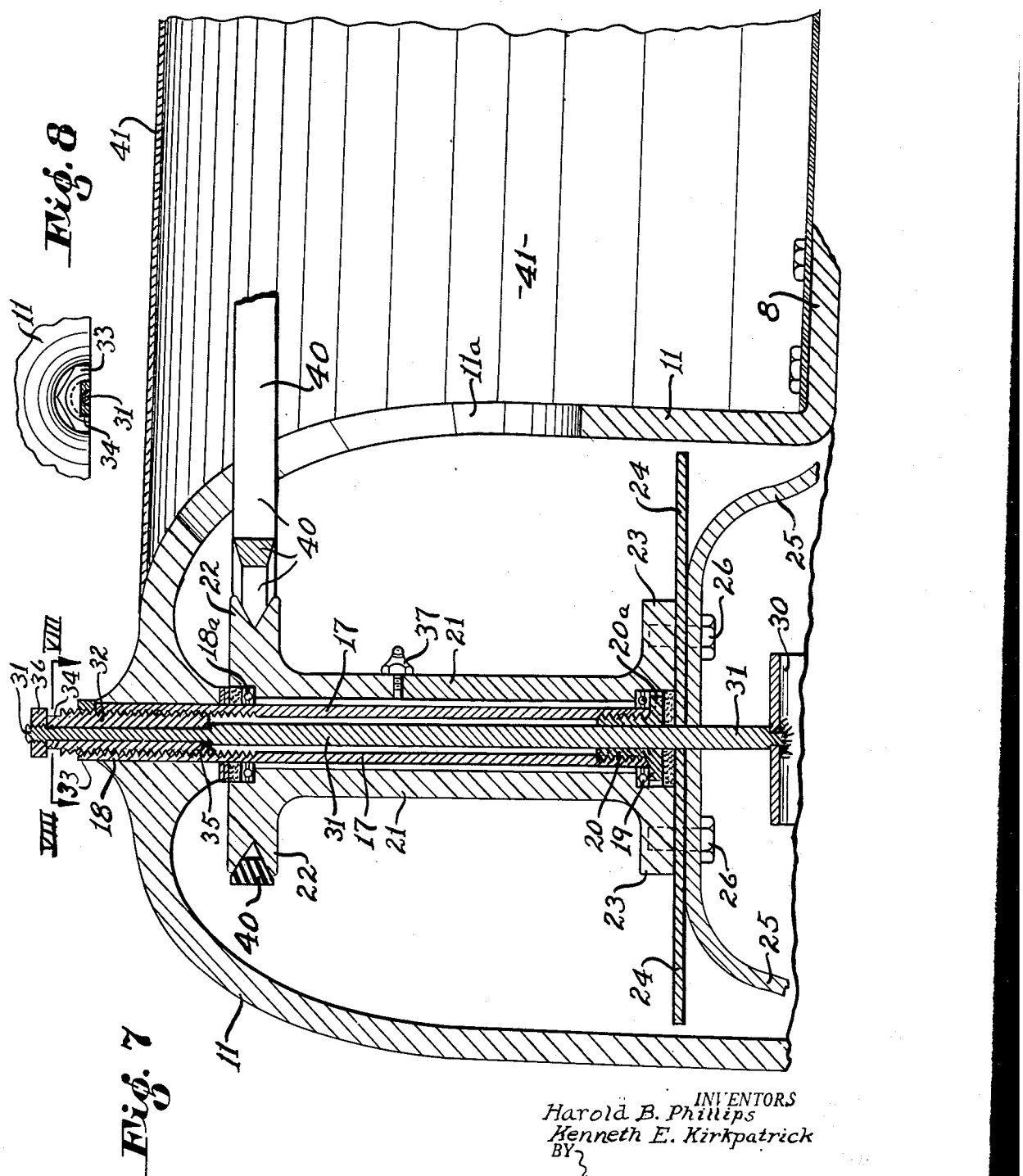

Patented Nov. 15, 1949

2,488,140

UNITED STATES PATENT OFFICE 2,488,140

LAWN MOWER

Harold B. Phillips and Kenneth E. Kirkpatrick, Wichita, Kans., assignors of one-third to Orville C. Coppenbarger, Wichita, Kans.

Application February 15, 1946, Serial No. 647,686

1 Claim. (Cl. 56—25.4)

Our invention relates to an improvement in lawn mowers. One object of our invention is to provide a lawn mower having a rotary cutter that operates in a substantially horizontal plane.

A further object is to provide a lawn mower of the kind mentioned that is power driven and has a one piece frame that is rigid and yet light in weight.

Another object is to provide a lawn mower of the kind mentioned that can be very easily manipulated and will cut close to foundation walls of a building, or curbs, trees, fences and the like.

A still further object is to provide a lawn mower of the kind mentioned that will always cut the same distance from the ground, even though the ground is comparatively rough and uneven.

A still further object is to provide a lawn mower of the kind mentioned in which the cutter element is well housed and protected and there is little danger of one getting his hands or feet into the machine so that he will be cut or injured.

A still further object is to provide a lawn mower of the kind mentioned in which the cutter may be easily adjusted toward or away from the ground; this adjustment can be easily made even while the machine is running.

A still further object is to provide a lawn mower of the kind mentioned in which the frame member of the machine can be adjusted to stand in at least approximate parallelism with the ground.

A still further object is to provide a lawn mower of the kind mentioned in which the cutter element of the machine can be easily and quickly removed from the machine for repair or sharpening purposes. These and other objects will be more fully described as this description progresses.

Now referring to the accompanying drawings in which similar numerals of reference designate the same parts throughout the several figures of the drawings; Fig. 1 is a top plan view of the lawn mower.

Fig. 4 is a bottom plan view of the lawn mower.

Fig. 5 is an edge or side view of the cutter element of the lawn mower.

Fig. 6 is an enlarged detail view through the frame and drive housing connection, the view being taken along the line VI—VI in Fig. 1 and looking in the direction of the arrows.

Fig. 7 is an enlarged detail sectional view through the drive and cutter adjustment mechanism of the machine, the view being taken along the line VII—VII in Fig. 1 and looking in the direction of the arrows.

Fig. 8 is a sectional view through the machine as seen from the line VIII—VIII in Fig. 7 and looking in the direction of the arrows.

Figure 1:
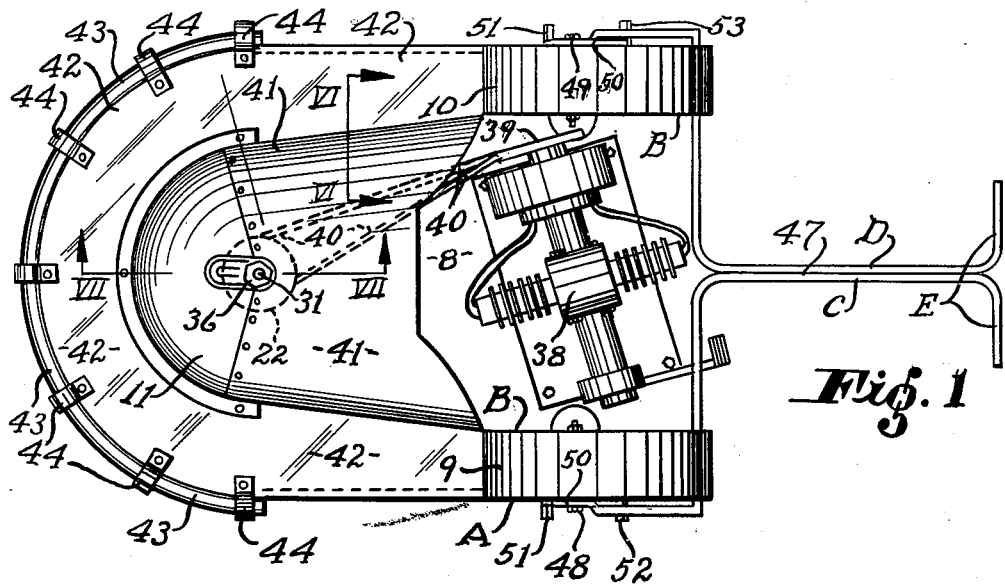
Figure 2:
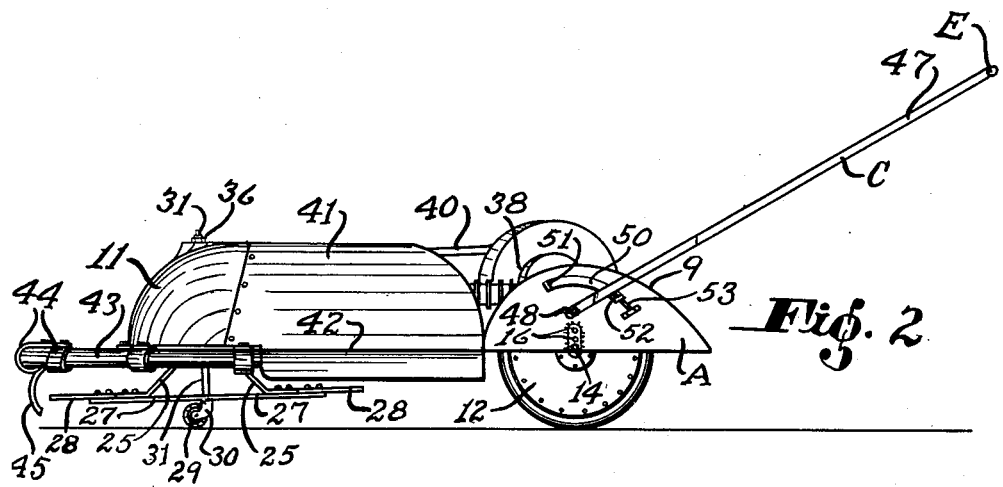
Fig. 2 is a side view of the lawn mower.
Figure 3:
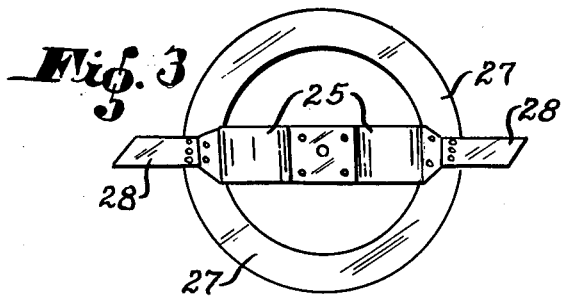
Fig. 3 is a bottom plan view of the cutter element of the lawn mower.

In the drawings the machine is shown as having a base frame plate 8 on which is integrally formed wheel housings 9 and 10, each of which have side walls A and B; and a spindle bearing support housing 11, all of which is formed in a single integral casting, if desired the element 11 may be made separately and bolted to the base plate 8.

Wheels 12 and 13 are positioned, one in each wheel housing 9 and 10 and are revolvable on axles 14 and 15 that are seated in holes, such as 16 in the housing walls A and B. The axles 14 and 15 are removable from and insertable in any of the holes 16 as an adjustment of the rear end of the base plate 8, up or down for reasons that will later be made obvious.

The spindle and drive housing 11 is provided with a tubular spindle element 17, the upper end of which passes through and is tightly pressed into an opening 18 in the upper or top portion of the housing 11, the tubular element 17 being rigidly held in substantially a vertical position.

On the upper and bottom ends of the tubular spindle 17 are antifriction bearings 18a and 19. The bottom bearing 19 is held in place by a flanged sleeve 20 that is threaded into the lower end of the tubular spindle 17, the flange 20a being the support for the antifriction bearing 19 as shown.

Revolvably carried by and between the antifriction bearings 18 and 19 is hub element 21 on the upper end of which is integrally formed a V-belt pulley 22, and on the bottom end of the hub element 21 is integrally formed an outwardly extending flange element 23.

Positioned against the bottom side of the flange 23 is a circular plate 24 and is positioned in the lower portion of the circular shaped spindle and drive housing 11 with the edge of the circular plate 24 running close to the inner surface of the housing 11. The plate 24 acts as a baffle to prevent material cut by the cutter of the machine being thrown up into the driving mechanism of the machine.

Bearing against the underside of the baffle plate 24 is the central portion of an inverted U- shaped support element 25, and bolts 26 are passed through the central portion of the U-shaped support element, and baffle plate element and are threaded into the hub flange 23 to provide a rigid assembly and attachment of the U-shaped support element 25 and circular baffle plate 24 to the hub flange 23.

A cutter supporting ring 27 is concentrically positioned below the baffle plate 24, and the lower ends of the legs of the U-shaped support element 25 are solidly riveted at diametrically positioned points to the circular cutter support ring 27.

One end of cutter knives 28 are solidly riveted at diametrically positioned points on and to the cutter supporting ring 27 and project outwardly therefrom.

The front end of the machine is supported on a castor wheel 29 that is revolvably carried in a castor yoke 30 that is rigidly attached, preferably welded, to the lower end of a castor shaft 31 that is revolvably carried in the spindle tube 17 and journalled in the flanged sleeve 20 and a second sleeve 32 that is threaded into the upper end of the spindle tube 17, and a nut 33 is threaded on the upper end of the adjustment sleeve 32 and bears against the upper face of the housing element 11 and serves as a lock to lock the sleeve 32 in its adjusted position. The upper end of the adjustment sleeve 32 is provided with a square wrench hold 34 by which the adjustment sleeve 32 may be turned for adjustment purposes as will later be described.

The upper end of the castor shaft 31 is provided with a shoulder 35 which bears against the lower end of the adjustment sleeve 32 and serves to support the front end of the machine in adjusted elevated positions. The extreme upper end of the castor shaft 31 is provided with a nut 36 that is threaded thereon and serves to prevent the castor shaft 31 from dropping from the sleeves 32 and 20 if the front end of the machine be lifted from the ground. The hub 21 is provided with an oiler 37 through which oil may be entered into the hollow of the hub 21 to lubricate the antifriction bearings 18 and 19.

Rigidly mounted on the rear portion of the base frame plate 8 is a power unit 38, preferably a small internal combustion engine, that has a V-belt drive pulley 29 thereon, and a V-belt 40 passes around and engages the V-belt pulleys 22 and 39 to deliver power from the power unit 38 to the V-belt pulley 22 to revolve the hub 21 and associated parts to rotarily drive the cutter blades 28.

An inverted U-shaped housing extension 41 is bolted to the housing 11 and base frame plate 8 and extends rearwardly to house the drive V-belt 40 and form a partial protection for the power unit 38.

A cutter housing plate 42 fits around the base of the housing dome 11 and rests on the base frame plate 8 and extends outwardly therefrom to point even with the outside of the wheel housings 9 and 10, and the front of the housing plate 42 is rounded to just cover the circular line of travel of the outer points of the cutter blades 28, and the front edge of the housing plate 42 is provided with a rubber bumper 43 that is held in place thereon by means of small metal clips 44 that wrap around the bumper 43 and the ends of which are bolted to the edge of the housing plate 42. The side edges of the housing plate 42 are turned or curved downwardly to form a stiffening portion and a further protective shield of the housing plate 42.

Rigidly fastened to the under side of the front end of the housing plate 42 is a pair of hook-like guard elements 45 and 46 that serve as a protective means for the cutter blades 28 to prevent sticks or other objects from being stuck by the cutter blades 28. The guards 45 and 46 also serve to protect the cutter blades 28 in case the castor wheel 29 should drop into a hole in the ground and thereby drop the front end of the machine to such a point that the cutter blades would dig into the ground, instead the guards 45 and 46 would strike the ground and support the front end of the machine.

The machine is provided with a handle member 47 that is made of two pieces of tubing C and D, the central portions of which are welded together and the lower ends bent outwardly and downwardly to form a bifurcated end, the ends of which are pivotally attached at 48 and 49 to the outside side plates A of the rear wheel housings 9 and 10. The outer ends of the handle tubes C and D are turned outwardly in opposite directions to form a hand hold E by which the machine may be pushed and guided as the machine is being used.

Rigidly attached to each side plate A of the wheel housings 9 and 10 is an arcuate element 50, the center of which is at the center of the handle pivot points 48. The ends of the arcuate elements 50 are turned outwardly as at 51 and 52 into the line of swing of the adjacent handle elements C and D and serve as an adjustment or limiting means for the downward movement of the handle 47.

The machine is made ready for use by first adjusting the cutter blades 28 to the desired distance above the ground at which point it is to cut the grass. This is done by loosening the lock nut 33 on the adjustment sleeve 32 and then placing a wrench on the wrench hold 34 of the adjusting sleeve 32 and then turning the sleeve 32 to screw it up or down which in turn moves the castor shaft 31 up or down which effects the raising or lowering of the front end of the machine which also raises or lowers the cutter blades 28 to the desired height above the ground. This adjustment having been made, the lock nut 33 may again be tightened to lock the adjusting sleeve 32 in its adjusted position.

This adjustment having been made, the power unit 38 may be started, whereby the drive pulley 39 is revolved and drives the V-belt 40 which in turn drives the V-belt pulley 22 and associated parts to rapidly revolve the cutter knives 28, which when they strike the grass, will cut the grass at the adjusted position above the ground.

Because of the castor wheel mounting of the front end of the machine the handle element E may be swung from side to side and the front end of the machine will similarly swing from side to side and ride on the castor 29. This makes it easy to move the machine along building foundation walls, around trees, curbs or other objects that must be cut around or close to.

The power unit being located on the rear of the base plate 8 as it is, the most of the weight of the machine is carried on the rear wheels 12 and 13, therefore the machine is so balanced that only a small amount of pressure in a downward direction on the handle elements E will be required to lift the front end of the machine from the ground. This is a desirable and handy feature in using the machine.

Such modifications of our invention may be employed as lie within the scope of the appended claim without departing from the spirit and intention of the invention. Now having fully shown and described our invention, what we claim is:

In a lawn mower device of the kind described; said device having, in combination, a frame plate, said frame plate having support wheel housings integrally formed thereon and at each rear side portion thereof, support wheels positioned in said housings and carried on axle elements that are adjustable up and down on the opposite side walls of the housing, a power unit, said power unit being mounted on and carried by the rear portion of said frame plate, said frame plate having an upwardly extending housing element positioned on the front portion thereof and being rigidly attached thereto, the upper central portion of said housing having one end of a tubular support element rigidly mounted therein and extending therethrough, the other end of the said tubular support extending downwardly to a point well toward the bottom of the said housing, the upper and lower ends of the said tubular support being internally threaded, bearing elements, one for and threaded in each end of the said tubular support, means on the lower bearing element for supporting another bearing assembly, a rotatable cutter support and drive element, said element being tubular in form and having a drive pulley integrally formed on one end thereof and a cutter element support integrally formed on the other end thereof, said cutter support and drive element being positioned around the said tubular support and having antifriction bearings in the ends thereof that are supported by the said tubular support for rotatably supporting the said cutter support, a circular baffle plate, said baffle plate being positioned within the last said housing and fitting comparatively close to the inner surface of the lower portion of the wall of the last said housing and being rigidly attached to the lower end of the said cutter support element, a cutter element, said cutter element having a ring and supporting frame therefor that is rigidly attached thereto, said supporting frame being rigidly attached to and supported by the lower portion of the said rotatable cutter support, a plurality of cutter blades, one end of said cutter blades being rigidly attached to said ring and outer ends of the cutter blades projecting outwardly from the ring, and means connecting between the power unit and the said pulley for driving the cutter supporting element and cutter assembly, a castor, the spindle of said castor being revolvably carried in the first two said bearings, the upper one of the first said bearings being adjustable longitudinally in the said tubular support to station and revolvably hold the castor spindle in adjusted elevated positions to adjust the spacing of the said cutter blades from the ground.

HAROLD B. PHILLIPS.
KENNETH E. KIRKPATRICK.

REFERENCES CITED

The following references are of record in the file of this patent:

UNITED STATES PATENTS

| Number | Name | Date |
|---|---|---|
| 1,876,504 | Rossiter et al. | Sept. 6, 1932 |
| 2,017,524 | Bolens | Oct. 15, 1935 |
| 2,154,564 | Eisenlohr | Apr. 18, 1939 |
| 2,253,452 | Urschel | Aug. 19, 1941 |
| 2,329,185 | Coddington | Sept. 14, 1943 |

FOREIGN PATENTS

| Number | Country | Date |
|---|---|---|
| 665,196 | France | Apr. 30, 1929 |